3,311,488
PROCESS FOR FORMING A REFRACTORY
COATING ON ALUMINUM
Ludwig Edward Seufert, Boothwyn, Pa., and Herbert Talsma, Bloemendaal, Netherlands, assignors to E. I. du Pont de Nemours and Company, Wilmington, Del., a corporation of Delaware
No Drawing. Filed July 9, 1963, Ser. No. 293,889
5 Claims. (Cl. 117—23)

This invention relates to dense refractory materials and their preparation. It is also concerned with the preparation of an alumina-based coating on aluminum.

The formation of aluminum oxide coatings on aluminum by an anodizing process is well known. However such coatings cannot be made more than about 10 mils thick which drastically limits the life-in-use of the coating and also limits the uses for which such composites can serve.

It is an object of this invention to provide a hard, dense alumina-based coating of desired thickness upon aluminum and a process for its preparation.

Another object is to provide a process for the preparation of a hard, dense, abrasion-resistant alumina-based material.

The process of the invention comprises heating at a temperature of above 800° C. (preferably above 1300° C.) a layer of molten aluminum which contacts a layer of a particulate refractory and at least 1% by weight based on said refractory of a fluxing agent, selected from the class consisting of oxides of alkali metals, hydroxides of alkali metals, magnesium oxide, zinc oxide, cobalt$^{II}$ oxide, copper$^{II}$ oxide, lead$^{II}$ oxide and precursors of the above. It will be apparent that the particulate material may be deposited initially on a layer of solid aluminum and the combination heated until the aluminum melts.

By the term "particulate" is meant a state of subdivision preferably granular so that all particles are smaller than about 4 mesh and preferably smaller than 100 mesh.

By the expression "refractory" is meant any substance having a melting or softening point above about 1300° C. Siliceous compounds are preferred. These include all manner of substances which contain silica or silicic acid based on chemical analyses.

Various clays such as kaolin, ball clay, and the many fire clays are satisfactory. The expression "clay" is used in the broad sense of a naturally occurring substance with a composition corresponding to that of an aluminosilicic acid, usually mixed with sand and other materials which becomes plastic when mixed with the proper amount of water. Burnt clays (i.e., grog) may be used.

Minerals containing magnesium and silicon, such as asbestos (e.g., chrysotile, $3MgO \cdot 2SiO_2 \cdot 2H_2O$, amosite, anthophyllite, crocidolite, tremolite and synthetic amphiboles); talc, steatite or soapstone (e.g., $3MgO \cdot 4SiO_2 \cdot 1H_2O$)

forsterite ($2MgO \cdot SiO_2$); and vermiculite (e.g., $6MgO \cdot 8SiO_2 \cdot 10H_2O$)

are satisfactory.

For reasons of economy, mineral substances are preferred. Magnesium and/or alumina silicates are preferred siliceous compounds.

Zinc oxide is also suitable as a refractory.

The aluminum oxide which results from the oxidation of the aluminum base, may combine with the refractory materials to form solid solutions or compounds or it may merely become part of the coating in the form of alpha alumina.

Generally the refractory substance may be any of the carbides of aluminum, boron, hafnium, niobium, silicon, tantalum, thorium, titanium, tungsten, vanadium, and zirconium; the nitrides of aluminum, boron, hafnium, niobium, tantalum, thorium, titanium, uranium, vanadium, and zirconium; the borides of chromium, hafnium, molybdenum, niobium, tantalum, titanium, tungsten, vanadium and zirconium; or the oxides of aluminum, beryllium, cerium, hafnium, lanthanum, magnesium, uranium, yttrium, the stabilized oxide of zirconium and less preferably silicon dioxide. Precursors and mixtures of and compounds containing the aforementioned refractory compounds can also be used.

In addition to aluminum alloys of aluminum with other metals in which aluminum constitutes the major component may be used.

The required fluxing agent may be (1) a part of the refractory substance as magnesium oxide in magnesia or talc or asbestos; (2) present as an impurity such as alkali metal oxides in the refractory substance of (3) it can be deliberately added to the refractory substance. Precursors of the flux, that is, compounds which decompose under the reaction contitions to yield the flux, may be employed. Carbonates fall into this category.

The process requires a container to hold the molten aluminum in contact with the surface of the particulate refractory. The container must be of a refractory material and preferably inert to the molten aluminum.

The surface of the aluminum should be reasonably free of dross or other contaminants but this is not too critical. The normal thin layer of aluminum oxide does not interfere with this process.

The composition of the coating can be controlled by the relative amount of aluminum metal and refractory substance. If a siliceous compound is used, the presence of a large excess of aluminum will extract much of the silicon metal produced in the reaction and afford a minimum of free silicon in the coating. The amount of aluminum will in general vary from a weight equal to the refractory substance to as much as twenty-five or more times the weight of the refractory substance.

The layer of particulate refractory may be as thin as about 10 mils or as thick as 500 mils or greater. The thickness of the final coating, i.e., that portion of the refractory layer that has been transformed into the coating, is dependent upon the amount of aluminum present, and the time and temperature of the reaction. Heating times of 15 minutes or more generally produce noticeable results. The coating is formed as a substantially uniform layer on the surface of the aluminum. Unreacted particulate refractory can be removed from the surface of the coating.

Although the invention is illustrated by a single batch process, the novel method can be carried out in a continuous manner. This can be accomplished by continuously supplying a trough with molten aluminum, and depositing the fluxing agent and refractory substance in a continuous manner on the aluminum surface. The coating is allowed to form as the particulate layer is moved along the aluminum surface to the exit of the system.

The novel product of the invention is a composite structure comprising a layer of aluminum to which is strongly adhered a dense coherent substantially crystalline coating containing at least 50% by weight of alumina in the form of one or more of the following: alpha alumina, compounds of alumina and a metal oxide or solid solution of a metal oxide in alumina or the aforesaid compounds of alumina. The coating will be at least 25 mils thick and preferably more than 60 mils thick. It will be substantially nonporous, having a porosity of under 10%. Small amounts of aluminum and/or silicon may be present in the coating and as mentioned previously, minor amounts of silicon may be present in the aluminum layer.

The coating of the preferred products is further characterized by a flexural strength of at least 10,000 pounds per square inch (p.s.i.) and a microhardness (Knoop method) of at least 900. The interface of the composite is a mechanically interlocked structure of the aluminum and the coating. The adherence is so great that by cooling from the melting point of aluminum, no spalling occurs and the composite structure can be sawed (with a diamond saw) without parting the coating.

The coated product results when the amount of aluminum initially employed is greater than that necessary to react and form coating material with all of the refractory that has been deposited on its surface. It may also be prepared by reducing time and/or temperature employed so that all of the aluminum has not had an opportunity to react. In the event one or more of those conditions are not met, all of the aluminum may be reacted with refractory and a product results which is substantially all coating material of the nature disclosed. These embodiments are illustrated in the examples below.

The composite structures of this invention are of great value in applications where a strong, hard, highly abrasion-resistant coating on aluminum is desired, e.g., the face of pistons.

Knoop hardness values are obtained using a Leitz Durimet microhardness tester with a loading of 50 grams unless other stated.

Flexural strength is measured according to ASTM Standard 1958, part 4, page 60, test C293–57T with the use of a span width of 1 to 4 inches.

All sieve measurements are made with U.S. Sieve Series.

EXAMPLE I

A plate of aluminum (2024 alloy containing 4.5% Cu, 0.6% Mn and 1.5% Mg) 5 inches by 6 inches x 0.5 inches (700 grams) is placed on a 0.25 inch thick layer of powdered alumina in a rectangular fire clay crucible. Talc (U.S.P. powder) (about 60 grams) is spread on the top to a depth of about ¼ inch. The crucible is placed in a furnace with an air atmosphere and heated to 1400° C. at a convenient rate. Heating at 1400° C. is continued for 12 hours. The furnace is cooled, the crucible removed and the product examined. The product which is substantially planar consists of a layer of aluminum metal of ⅛ to ⅜ inch thick coated with a dark gray coating about 3/16 inch thick.

The coating adheres to the aluminum very strongly, a section cut with a diamond saw shows that the aluminum penetrates into the coating layer and provides mechanical locking of the two components. A section of the coating is moved by vigorous hammering. Cut sections of this coating have flexural strengths of 14,200 and 13,800 p.s.i. at 25° C. Densities of 3.48 and 3.47 grams/cm.$^3$ are obtained by an air comparison pycnometer (model 930 by Beckman Instruments, Inc. of Fullerton, Calif.) and mercury immersion methods respectively showing that the coating has essentially no porosity. The Knoop microhardness of the product is greater than 900.

X-ray diffraction data on a sample of the coating shows it to be composed principally of alpha alumina and spinel with minor amounts of silicon metal and aluminum metal. Repetition of the above process with a one-inch layer of talc (250 gms.) and heating time of 120 hours gives a product (1225 grams) that is substantially entirely the above coating material and is about ⅜ inch thick.

EXAMPLE II

The procedure of Example I is followed using a plate of aluminum (99% Al) and 100 grams of zinc oxide. Heating 120 hours at 1400° C. converts all of the aluminum to a plate of "coating." The plate is composed of alpha alumina, zinc aluminate ($ZnAl_2O_4$) and some finely dispersed aluminum metal. The product has a Knoop hardness of 976, 1268 and 1200 at loadings of 200, 300 and 500 grams.

EXAMPLE III

Twenty-five grams of aluminum (99.9% Al) is placed in a 40 ml. alumina crucible, the aluminum melted in a furnace, the surface of the aluminum skimmed and the crucible cooled. One gram of a refractory substance is placed on the surface of the solid aluminum and the crucible reheated in an air atmosphere to 1400° C. where it is held for 30 minutes.

The following refractory substances are used:

magnesium oxide (−325 mesh, 100% MgO)
a bonding clay ($SiO_2$ 57.3%, $Al_2O_3$ 28.5%, alkali metal oxides 1–5%, MgO 0.22%, other impurities about 3.5%, ignition loss 9.4%),
a bentonite clay (volclay bentonite by American Colloidal Co. of Skokie, Ill. containing $SiO_2$ 64.3%, $Al_2O_3$ 20.7%, MgO 2.3%, $Na_2O$ 2.6%, $K_2O$ 0.4%, and other impurities about 4.1%),
asbestos fines-chrysotile asbestos All of the above substances produce a strong, dense, hard, substantially uniform coating of from 0.1 to 0.2 inches thick on the top surface of the aluminum. The coating from asbestos has a Knoop hardness of 1389 as compared to 20 for the adjacent aluminum. The coating from the bentonite clay has a Knoop hardness of 1138 (50 grams loading).

EXAMPLE IV

This example illustrates the critical need of a fluxing agent. The procedure of Example III is used except the reaction is carried out for 10 hours at 1400° C.

The refractories used are as follows:

alumina—a high fired alumina (Alcoa tabular alumina, 99.5% $Al_2O_3$ about 0.02% $Na_2O$) of 14/28 mesh.
$SiO_2$—sand of about 10/20 mesh.
silica flour—100 mesh.
clay—a South Carolina Kaolin containing $Al_2O_3$ 37.1%, $SiO_2$ 45.8%, $Na_2O$ less than 0.2%, $K_2O$ less than 0.2% and MgO 0.1%.

No coating is formed and the refractory can be brushed off the surface of the cold aluminum after the heating.

When the procedure is repeated with the addition of 0.3 grams of sodium hydroxide or sodium silicate to the refractory compound the coating of this invention is obtained with each of the above refractory compounds. The coating consists of a substantially uniform layer of about 0.1 inch thick with occasional protuberances of the same material of up to 0.3 inch height. While not preferred for use as a coated aluminum structure, this material may be ground to fine grit for use on abrasive papers, films and the like.

The use of copper(II) oxide, tungsten(VI) oxide, cobalt(II) oxide, lead(II) oxide and phosphorous pentoxide as a refractory substance (with no added fluxing agent) under the conditions of Example III affords a thin (less than 25 mils thick) coating on the aluminum.

What is claimed is:

1. A process comprising heating at a temperature of above 800° C. a layer of molten aluminum which contacts thereon a layer of particulate refractory, said refractory including at least 1% by weight of a fluxing agent selected from the group consisting of the oxides and hydroxides of alkali metal, magnesium oxide, zinc oxide, cobalt$^{II}$ oxide, copper$^{II}$ oxide, and lead$^{II}$ oxide and precursors thereof, to form a dense coherent substantially crystalline material.

2. The process of claim 1 wherein the particulate refractory is talc.

3. The process of claim 1 wherein the particulate refractory is magnesium oxide.

4. The process of claim 1 wherein the particulate refractory is a clay.

5. The process of claim 1 wherein the heating temperature is above 1300° C.

References Cited by the Examiner

UNITED STATES PATENTS

| | | | |
|---|---|---|---|
| 1,014,967 | 1/1912 | Jacobs | 22—202 |
| 1,464,569 | 8/1923 | Guptill | 117—16 X |
| 1,536,524 | 5/1925 | Pfersdorff | 117—16 |
| 2,032,694 | 3/1936 | Gertler | 117—16 |
| 2,702,750 | 2/1955 | George | 106—58 |
| 2,707,691 | 5/1955 | Wheildon | 117—105.2 |
| 2,976,166 | 3/1961 | White et al. | 117—23 |
| 3,034,908 | 5/1962 | Sawchuk | 106—65 |
| 3,121,643 | 2/1964 | Eisenberg | 117—105.2 |

RALPH S. KENDALL, *Primary Examiner.*